United States Patent [19]

Adams et al.

[11] Patent Number: 4,699,400
[45] Date of Patent: Oct. 13, 1987

[54] INFLATOR AND REMOTE SENSOR WITH THROUGH BULKHEAD INITIATOR

[75] Inventors: Gary V. Adams, Perry; David P. Dahle, Logan; George Kirchoff, Brigham City, all of Utah

[73] Assignee: Morton Thiokol, Inc., Chicago, Ill.

[21] Appl. No.: 751,345

[22] Filed: Jul. 2, 1985

[51] Int. Cl.⁴ .......................................... B60R 21/26
[52] U.S. Cl. .................................. 280/731; 285/190; 102/275.5
[58] Field of Search ...................... 280/731, 734, 728; 339/3 S; 102/275.5, 275.8; 285/190

[56] References Cited

U.S. PATENT DOCUMENTS

| | | | |
|---|---|---|---|
| 791,144 | 5/1905 | Gannon | 285/190 |
| 2,210,088 | 8/1940 | Longfield | 285/190 |
| 2,649,311 | 8/1953 | Hetrick | 280/734 |
| 3,525,536 | 8/1970 | Pruneski | 280/731 |
| 3,552,769 | 1/1971 | Kemmerer | 280/734 |
| 3,590,739 | 7/1971 | Persson | 102/275.5 |
| 3,663,035 | 5/1972 | Norton | 280/734 |
| 3,801,123 | 4/1974 | Jira | 280/731 |
| 3,876,272 | 8/1975 | Tsutsumi et al. | 280/731 |
| 3,954,234 | 5/1976 | Frost et al. | 285/190 |
| 4,218,073 | 8/1980 | Cymbal | 280/731 |
| 4,272,102 | 6/1981 | Burkdoll | 280/731 |

Primary Examiner—David M. Mitchell
Assistant Examiner—Karin L. Ferriter

[57] ABSTRACT

An assembly for coupling an ignitive reaction to the inflator of a steering wheel mounted air bag safety system utilizes a through bulkhead initiator of the inflator through a slip joint or ring on the steering shaft which holds stationary a pyrotechnic transfer/booster from a collision responsive sensor and allows the inflator to turn with the steering wheel.

19 Claims, 7 Drawing Figures

GAS GENERANT PELLETS

INFLATOR AND REMOTE SENSOR WITH THROUGH BULKHEAD INITIATOR

BACKGROUND OF THE INVENTION

1. Field of the Invention

This invention relates to vehicle safety apparatus, and more particularly to a steering wheel mounted air bag safety system that is connected with apparatus mounted in another relatively stationary part of the vehicle.

2. Description of the Prior Art

The gas generator or inflator of an air bag safety system for protecting the driver of a vehicle is advantageously mounted on the steering wheel. A major problem with steering wheel mounted inflator systems is the interface to the inflator to ignite it. Such a mounting requires that the connection for igniting the inflator must include a connector or coupling assembly which provides for relative motion between the steering wheel and the steering column while maintaining an ignitive connection between the inflator and a collision responsive sensor that usually is located in another and remote part of the vehicle. Space in the steering column is limited and the steering wheel is turned a great many times during the operation of the vehicle. The coupling assembly at the interface must, therefore, be both compact and reliable in operation. It must assure reliable operation during the life of the vehicle in which it is installed, which may be ten (10) years or longer.

For providing such coupling at the interface a steering wheel mounted inflator, electrical coupling arrangements have been proposed in the prior act as disclosed in U.S. Pat. No. 3,525,536, issued to J. C. Pruneski on Aug. 25, 1970 and in U.S. Pat. No. 3,876,272 issued to M. Tsutsumi et al. on Apr. 8, 1975.

In U.S. Pat. No. 3,525,536 the coupling comprises a flexible printed circuit strip that is loosely coiled around the steering shaft with one end thereof electrically connected to the shaft. The other end of the strip is electrically connected to the steering column. Slack in the strip is taken up or decreased by rotation of the steering wheel in one direction and re-established or increased by rotation of the steering wheel in the opposite direction.

The coupling assembly provided in U.S. Pat. No. 3,876,222 comprises a bearing having an inner race and an outer race with an electrically conductive lubricant hermetically sealed therein. The inner race and the outer race are secured to the steering shaft and steering column, respectively, each through an individually associated insulator. A first electrical cord leading to the inflator and a second electrical cord leading to a power source are connected to the inner race and outer race, respectively.

It also known in the art to provide an electrical coupling assembly including slip rings and contact buttons or brushes to the inflator. Such an arrangement is disclosed in U.S. Pat. No. 4,218,073 issued to W. D. Cymbal on Aug. 19, 1980.

The use of electrical circuity is disadvantageous in a number of respects when employed in vehicle safety apparatus. This is for the reason that it may cause false or unwanted operation due to extraneous electrical currents or electromagnetic radiation, or operation, when required, may not occur due to failure of the electrical power source or shorting out of the circuitry. Electrical circuits also tend to become unreliable in operation over long periods of time as a result of wires becoming brittle and breaking. With circuits involving slip rings and brushes, there is difficulty, also, in maintaining circuit continuity, particularly in cold and freezing weather during which ice film formations or contact corrosion tend to break circuit continuity.

As an alternative to the actuation of a steering wheel mounted inflator by electrical circuity, it is known in the art to use pyrotechnic means for activating the inflator. Pyrotechnic inflator activating systems have certain advantages over electrical systems. These advantages include the following:

(a) they operate independently of electrical power;
(b) they can't be fired inadvertently by electrical disturbance or electromagnetic radiation;
(c) they provide long-term reliability;
(d) they require little maintenance;
(e) they are insensitive to freezing weather; and
(f) they are relatively safe to manufacture.

As with electrical systems, problems have been experienced with pyrotechnic inflator activating systems in respect of difficulty encountered in coupling the ignitive reaction or shock wave between a relatively stationary portion of the system, a collision responsive sensor, and a relatively movable portion, specifically, the inflator mounted on the steering wheel.

A pyrotechnic system, at disclosed in U.S. Pat. No. 3,552,796 issued to R. M. Kemmerer et al. on Jan. 5, 1971, utilizes a mechanical sensor which fires a percussion primer upon the occurrence of a collision and a detonating fuse assembly for transmitting the percussive shock wave to a steering wheel mounted inflator. In order to enable the inflator to be rotated with the steering wheel relatively to the steering column, a coupling assembly is provided comprising a loop or ring of detonating fuse which is mounted on the steering wheel and extends from the inflator to an area of the steering wheel immediately adjacent to and concentric with the steering column. Mounted on the steering column, spaced from but in close proximity to the loop of detonating fuse, are a pair of spaced apart blasting caps that are connected by the detonating fuse assembly to the percussion primer in the sensor. Upon rotation of the steering wheel, the loop of detonating fuse is rotated so that part of it is at all times immediately adjacent to both of the blasting caps.

Another assembly for coupling a percussive shock wave from a remotely located sensor to a relatively movable inflator mounted on the steering wheel of a vehicle is disclosed in U.S. Pat. No. 4,272,102 issued to F. B. Burkdoll June 9, 1981. That arrangement includes first and second relatively movable but rigid body members with an annular transmission channel for ignitive reactions in one of the body members. The transmission channel comprises a groove that is coated with exothermal material. Pyrotechnic transmission lines are connected to the body members from the sensor and the inflator for communication through the transmission channel, this notwithstanding relative movement of the body members.

Such pyrotechnic coupling arrangements of the prior art are rather complex, involving many component parts. In addition, they require special sealing provisions for containing the ignition reaction and do not lend themselves readily for use in existing steering columns of vehicles without major rework. Thus, there is a need and a demand for further improvement in the art for solving the interface problem to the steering wheel mounted inflator to ignite it.

SUMMARY OF THE INVENTION

An object of the present invention is to provide for use in an vehicle safety apparatus comprising a steering wheel mounted inflator and a system for actuating the inflator responsively to the occurrence of a collision, as sensed by a remotely located and relatively stationary sensor, a new and improved assembly for coupling an ignitive reaction or detonating shock wave to the inflator from the sensor.

Another object of the invention is to provide such an improved coupling assembly that may be readily and safely installed, at relatively low cost, on existing vehicles.

A further object of the invention is to provide such an improved assembly that may readily be substituted for use with inflators designed for electrical actuation and intended to incorporate a squib therein for initiating the inflator operation.

Still another object of the invention is to utilize a through bulkhead initiator of the inflator through a slip joint which holds the ignitive reaction transfer/booster stationary and allows the inflator to turn with the steering wheel.

In accomplishing these and other objectives of the invention, there is provided, at the upper end of the vehicle steering column, a pyrotechnic coupling assembly comprising an annular slip joint or ring which affords communication between a relatively stationary pyrotechnic transmission line from a remotely located collision responsive sensor and a pyrotechnic transmission line provided in the upper end of the cylindrical steering shaft, internally thereof. The last mentioned transmission line communicates with the inflator of an air bag safety system mounted on the steering wheel. The sensor may be placed at the base of the steering column, on the steering box, for example, or any other location for best sensing.

The pyrotechnic coupling assembly includes a pyrotechnic transmission line that has one end connected to the inflator for initiating, that is, igniting it. The connection of the transmission line to the inflator is by means of a fitting. The transmission line extends from the inflator internally of and axially along an upper portion of the steering shaft through a first hole formed therein. The first hole has a first end and a second end with the first end even with the upper end of the shaft. The first hole is an axially extending hole and communicates at the second end thereof, internally of the shaft, with one end of a second hole. The second hole is a radial hole in the shaft that provides communication between the second end of the first hole and the outer cylindrical surface of the shaft.

The slip ring is positioned in surrounding relationship with the shaft, having an inner cylindrical surface that mates with the cylindrical surface of the shaft, and is disposed in rotative sliding relationship therewith. Formed in the inner cylindrical surface of the slip ring is an internal annular groove or radial plenum which communicates with the radial hole in the steering shaft and thereby with the transmission line in the first or axially extending hole in the shaft. The radial plenum also communicates with a pyrotechnic transmission line leading from the sensor through a hole that extends radially from the radial plenum to the outer periphery of the ring.

BRIEF DESCRIPTION OF THE DRAWING

Having summarized the invention, a detailed description follows with reference being had to the accompanying drawings which form part of the specification, of which.

DESCRIPTION OF THE PREFERRED EMBODIMENT

Figure 1:
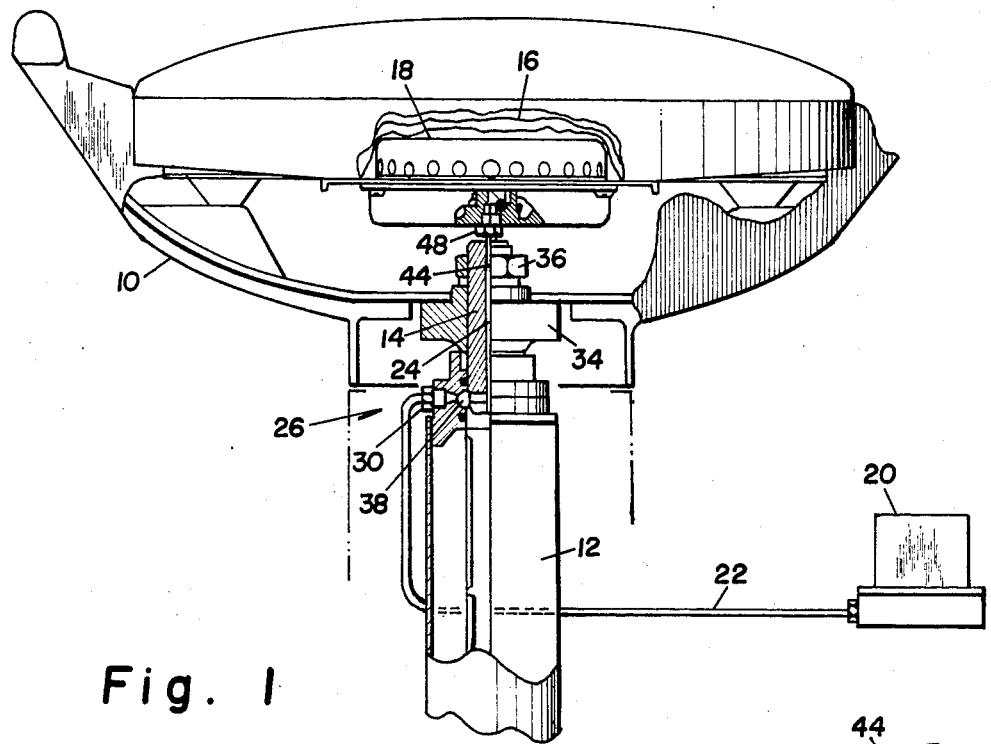
FIG. 1 is a fragmentary view partly in cross section, of the steering wheel, steering column and steering shaft of an automobile and showing a coupling assembly incorporating the invention for initiating operation of a steering wheel mounted pyrotechnic air bag system.
Figure 2:
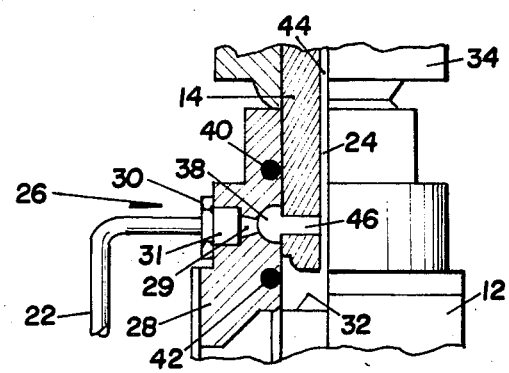
FIG. 2 is an enlarged cross sectional view of a coupling device employed in FIG. 1.

In FIG. 1 of the drawings, the invention is illustrated in conjunction with a vehicle such as an automobile (not shown) having a steering wheel 10 that is mounted on a cylindrical steering column 12 and is arranged for the rotation of a cylindrical steering shaft 14 for steering the automobile. An inflatable air bag 16 and a pyrotechnically actuated inflator or gas generator 18 are mounted in the hub portion of the steering wheel 10 with the inflator 18 being attached to the air bag 16 for the inflation thereof. A sensor 20 responsive to the onset of a collision and positioned for example at the base of the steering column on the steering box, is connected to the inflator 18 by pyrotechnic transmission lines 22 and 24 which are coupled together by a transmission line coupling device 26. For convenience, transmission line 22 is sometimes referred to herein as a "first transmission line" and transmission line 24 is referred to as a "second transmission line." Sensor 20 may include a percussion primer and mechanical firing pin means including an inertial mass for firing the primer under predetermined conditions of deceleration of the vehicle.

It will be understood that, if desired, the collision reponsive sensor 20 may be of a type that produces an electrical signal upon the onset of a collision and a blasting cap or squib may be provided on the steering box at the base of the steering column 12 for initiating an ignitive reaction in the transmission line 22 and of the pyrotechnic system. The transmission lines 22 and 24 may be of the type described in U.S. Pat. No. 3,590,739 issued to Per-Anders Persson on July 6, 1971 for "Fuse." Transmission lines of this type are sold commercially under the trademark "TLX" by Explosive Technology, a Subsidiary of OEA, Inc., Fairfield, Calif. This type of transmission line comprises a hollow tube having a reactive substance coating the inner surface thereof. The coating is operative to support and propagate a gaseous percussion wave throughout the length of the tube. While not critical to the operation of the pyrotechnic system, the hollow pyrotechnic transmission lines may be of the type sold commercially by Explosive Technology under the Cord Designation "PP-23-T" and having an external diameter of 3.05 mm. and an internal diameter of 0.055 mm.

First transmission line 22 extends from sensor 20 to a slip joint or ring 28 that is mounted on the steering shaft 14 of the vehicle between the steering shaft 14 and the steering column 12. Ring 28 is disposed in fixed relation with steering column 12 and in sliding relation with respect to steering shaft 14. Line 22 is connected to the slip ring 28 by a fitting 30 which is threadedly received in hole 31 in the slip ring 28.

The slip ring 28 is supported on shaft 14 for relative rotation therewith between a shoulder 32 on shaft 14 and a hub 34 of the steering wheel 10. Hub 34 is attached to the upper end of shaft 14 in suitable manner by a bolt 36. The slip ring 28 has an inner surface that engages the surface of shaft 14 and has a radial plenum 38 that extends circumferentially of the ring and communicates with the end transmission line 22 through the fitting 30.

A radial hole 29 having a diameter approximating that of the transmission line 22 provides communication between hole 31 and the radial plenum 38. Transmission line 22 terminates at the inner end of fitting 30 adjacent the outer end of radial hole 29. No reactive coating or other substance is provided, nor required, on the inner surface of the radial plenum 38 for transmitting an ignitive reaction from transmission line 22 to transmission line 24. For sealing purposes, an O-ring 40 is provided on one side of the radial plenum 38 and an O-ring 42 is provided on the other side thereof.

Second transmission line 24 is positioned in hole 44 that extends internally of and axially along a portion of the length of the steering shaft 14 from an upper or front end thereof. Transmission line 24 is substantially entirely enclosed in hole 44 and is protected thereby from external influences that may tend to cause damage thereto. A radial hole 46 in shaft 14 at the inner or second end of hole 44 provides communication between the inner end of transmission line 24 and the radial plenum 38 formed by ring 28.

Figure 4:
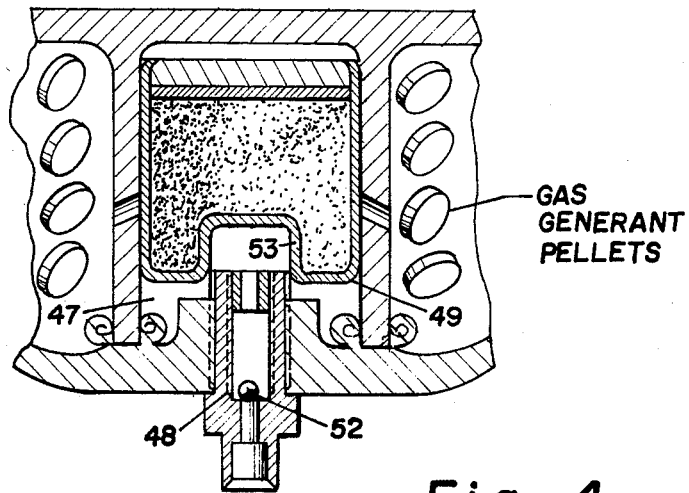
FIG. 4 is a fragmented cross sectional view showing the fitting of FIG. 3 utilized, according to the invention, in an inflator to initiate the inflation operation.

At its upper end, the transmission line 24 is connected by a fitting 48 to the inflator 18, which fitting is threadedly received for ignitive reaction communication with an igniter chamber 47 therein, as best shown in FIG. 4. Fitting 48 is also threadedly received in the upper end of the steering shaft 14.

Positioned within igniter chamber 47 is a rupturable closed aluminum container 49 containing igniting material 56. Container 49 may be hermetically sealed against moisture and has a recess or cavity 53 formed in the bottom thereof which receives the end of fitting 48.

Figure 3:
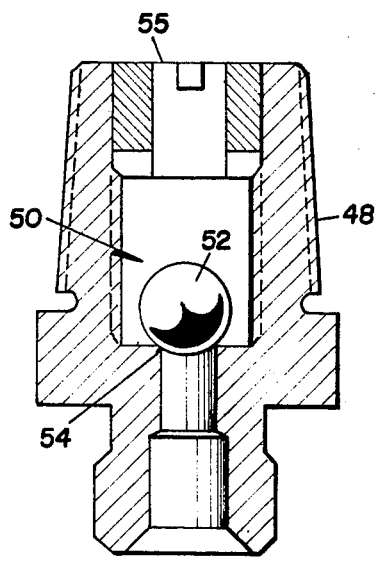
FIG. 3 is an enlarged and detail view of a fitting incorporating a check value used with the inflator to prevent flash back upon ignition of the inflator.

As shown in FIG. 3, fitting 48 may incorporate a check valve 50 comprising a ball 52 that is adapted to engage in sealing manner a valve seat 54 to close the valve upon a rise in pressure within the inflator 18, as normally occurs upon the ignition thereof.

A breakwire 55, as illustrated in FIG. 3, may be provided on the exit end of fitting 48, that adjacent inflator 18, to provide an indication of whether or not ignition of the sensor 20 and the transmission lines 22 and 24 has occurred. Alternatively, the breakwire 55 may be provided on the upper end of the steering shaft 14, as seen in FIG. 1. While the breakwire 55 is intact, an installer of the system is assured that the pyrotechnic system has not been fired. A break in the breakwire 55, however, serves as a visual indication that such firing has occurred and that, therefore, the transmission system is no longer operative and requires replacement. The breakwire 55 may be connected, if desired, in a suitable electrical circuit including a lamp (not shown) mounted on the instrument panel of the vehicle to provide a visual indication to the operator as to the state of readiness of the pyrotechnic system to function.

Operation and use of the invention is described assuming that a pyrotechnic air bag system incorporating the invention is installed in an automobile as described with reference to FIG. 1. An impact of predetermined magnitude will cause the percussion primer in sensor 20 to fire to produce an ignitive reaction or detonating shock wave which is propagated through the pyrotechnic transmission line 22 to the coupling device 26. At the coupling device 26, the shock wave enters the latter, finds the radial hole 46 in the steering shaft 14 that leads to the lower end of the pyrotechnic transmission line 24 and causes an ignitive reaction in the latter. This ignitive reaction occurs irrespective of the relative positions of the radial hole 46 and the fitting 30 that connects the transmission line 22 to the coupling device 26 and transmits the ignitive reaction to the igniter of the inflator 18. The air bag is rapidly inflated by the inflator 18.

The invention may be used with inflators of known type including those fabricated using steel for the casing and other housing structural components. Such inflators, typically, are initiated by the detonation of an electrically activated blasting cap or squib, as disclosed, for example, in the aforementioned Pruneski patent or in U.S. Pat. No. 4,296,084 issued to Gary V. Adams, et al. on Oct. 20, 1981 for METHOD OF AND APPARATUS FOR GAS GENERATION. The necessary modification for enabling such use may be made by removing the blasting cap or squib and the electrical circuity therefor and substituting therefor a fitting 48 with a check valve 50 therein, as illustrated in FIG. 4, and a pyrotechnic transfer line including a sensor 20, transmission lines 24 and 22, a coupling device 26, and a mechanical sensor 20.

Recent emphasis on weight reduction in automobiles has created a demand for a lighter weight crash bag inflation system than that available using an inflator, the structural housing components of which are made of steel. This is of particular importance in a system for driver crash protection where the air bag system including the inflator is mounted on the steering wheel of the vehicle. A lighter weight inflator enables a reduction to be made in the weight of the steering shaft and steering column on which the inflator is mounted. A preferred form of such a light weight inflator is disclosed in the copending application bearing Ser. No. 595,774 filed on Apr. 2, 1984 of G. V. Adams, et al., now U.S. Pat. No. 4,547,342 the disclosure of which application and patent, by reference herein, is made a part hereof.

Figure 5:
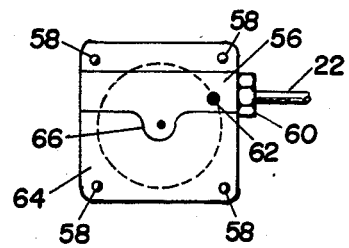
FIG. 5 is a plan view of a flange mount that may be used for attaching the collision responsive sensor of the air bag systems of FIG. 1 to the vehicle.

In FIG. 5 there is illustrated a flange mount 56 that may advantageously be used with the sensor 20 of FIG. 1 for mounting the sensor at the base of the vehicle steering column or at another appropriate location. The flange mount 56, as shown, includes fastening holes 58 at each of the four corners thereof for bolting the mount 56 to the vehicle. A fitting 60 in one side of the flange mount 56 communicates internally thereof with a transfer pyrotechnic tube 62 that extends upwardly from the upper surface of the mount 56. The transfer tube 62, similarly to the pyrotechnic transmission lines 22 and 24 may include a reactive substance coating the inner surface thereof that is operative to support a gaseous percussion wave throughout the length thereof.

When a sensor 20 is coupled to the flange mount, the transfer tube 62 extends into the interior of the sensor. Upon actuation of the sensor 20 responsively to the onset of a collision, the transfer tube 62 is operative to transmit the percussion wave through the flange mount 56 and fitting 60 to a pyrotechnic transmission line for example, the line 22, as seen as FIG. 1.

As shown in FIG. 5, the upper surface 64 of flange mount 56 includes a keying slot 66 for faciliating the proper placement of the sensor 20 on it to effect the desired coupling to the transfer tube 62, a mating keying protection (not shown) being provided on the bottom surface of the associated sensor 20.

Figure 6:
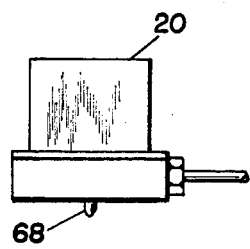
FIG. 6 is a view of the sensor illustrating an arming pin for disarming the sensor until mounted on the flange mount.

For preventing actuation of the sensor 20, when not mounted on the flange mount 56, as during shipping or when in storage, there desirably is provided on arming pin 68 from the bottom thereof. This arming pin 68 when projecting outwardly, as seen in FIG. 6, provides an interlock that prevents movement of the inertial mass to fire the percussion primer therein. The interlock is automatically released when the sensor is placed on the mounting flange 56 and bolted thereto and to the vehicle, such placement serving to push the arming pin 66 into the sensor thereby to effect the interlock release.

Figure 7:
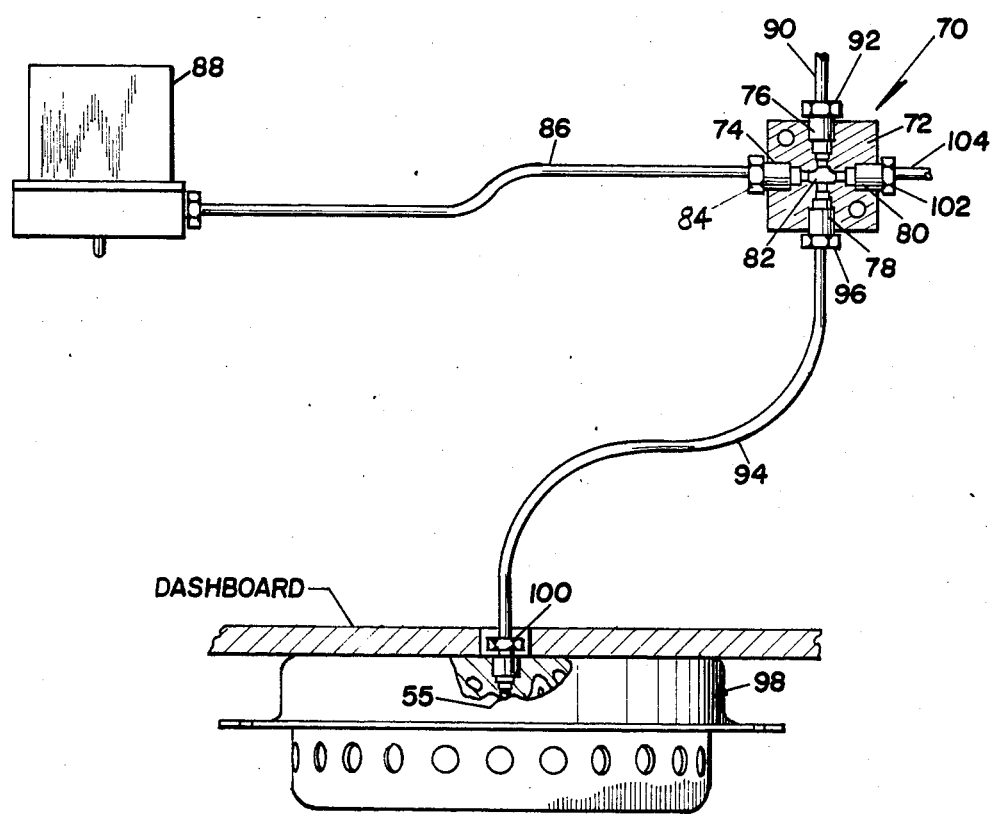
FIG. 7 illustrates a modification of the invention utilizing a junction box for initiating one or more pyrotechnic transmission lines, one, for example, for initiation of the operation of an inflator on the passenger side of an automobile, and the other for the driver steering wheel mounted inflator.

In FIG. 7 there is illustrated a modification of the invention utilizing a junction box 70 that is connected by a transmission line 86 to a mechanical sensor 88 that may be identical to the sensor 20 of FIGS. 1 and 6 which is mounted on a flange mount 56 as illustrated in FIG. 5. The junction box 70 is provided for initiating a plurality of pyrotechnic transmission lines responsively to the actuation of a common, that is, the same sensor.

The junction box 70 comprises a square metal block 72 having four tapped holes 74, 76, 78 and 80 therein with the holes all being in the same plane, one in each of the four sides of the block 72, and merging into a common opening 82 at the center of block 72. Similarly to the radial plenum 38 of the ring 28 of FIG. 1, no reactive substance is used, nor required, on the inner surfaces of opening 82.

An individually associated fitting for connecting a pyrotechnic transmission line is threadedly received in each of the holes 74, 76, 78 and 80. Thus, a fitting 84 received in hole 74, is connected by a transmission line 86 to a mechanical sensor 88. Another transmission line 90, connected at one end by a fitting 92 to hole 76 in the junction box 70, may be connected at its other end to a pyrotechnic transmission line leading to a wheel mounted inflator (not shown) which may be similar to the inflator 18 of FIG. 1. Such a connection would include a coupling device 26, a transmission line 24 in an axial hole 44 in the upper portion of the steering shaft, and a fitting 48 with a check valve 50 therein, as shown in FIG. 1.

Still another one of the transmission lines, indicated at 94 and connected at one end by a fitting 96 to be tapped hole 78 in the junction box 70, may be connected at its other end directly to an inflator 98 that may be suitably positioned on the passenger side of an vehicle for protecting passengers therein. The connection at the other end of the transmission line 94 to the inflator 98 includes a fitting 100 having a check valve therein and which may be identical to the previously described fitting 48 with the check valve 50 and including a breakwire 55. Since there is no relative movement required between the inflator 98, which may be fixedly mounted on the vehicle dashboard, and the junction box 70, a coupling device, such as the coupling device 26 of FIG. 1, is not required for the passenger inflator 98.

A fitting 102 in tapped hole 80 in junction box 70 may be used to initiate another pyrotechnic transmission line 104. If this fitting 102 and line 104 are not required, a suitable plug may be used to seal the hole 80.

Thus, there has been provided, in accordance with the invention, an improvement in vehicle safety apparatus comprising a pyrotechnically actuated inflator and remote sensor with through bulkhead inflator initiation. The invention has particular utility for steering wheel mounted inflators. It incorporates a simple and unique reliable assembly involving a minimum number of components for coupling at the interface to the inflator an ignitive reaction to ignite the inflator. The cost to install the system as an option on initial installation or after market is greatly reduced compared to the prior art systems. The system is safe to install since there is no electrical blasting cap or squib to be fired inadvertantly. Modifications required to existing inflators utilizing squib initiation, including light weight aluminum inflators, are very simple, as described hereinbefore. With the invention embodied in a pyrotechnic system utilizing a light weight aluminum inflator, the weight added to the steering wheel and steering column is kept to a minimum. A breakwire on the end of the fitting that connects the pyrotechnic system to the inflator provides a ready means to monitor the state of readiness of the pyrotechnic system to function in the event of a collision of the vehicle of impact sufficient to actuate the collision responsive sensor.

What is claimed is:

1. A device for coupling an ignitive reaction between two transmission lines having gas channels therein through which the reaction is propagated comprising, an elongated shaft having an end and an outer cylindrical surface over a portion at least of the length thereof and having a first hole and a second hole formed therein, the first hole having a first end and a second end and extending from the first end internally of and axially from the end of said shaft along a substantial portion of the length thereof, the second hole extending radially of said shaft from the second end of the first hole to the outer surface of said shaft, one of said transmission lines being substantially entirely positioned in the first hole of said shaft and extending for at least the full length of the first hole, a ring positioned in surrounding relationship with said shaft, said ring having an outer periphery and an inner cylindrical surface, said inner cylindrical surface mating with the outer cylindrical surface of said shaft, being in a rotative sliding relationship therewith, said ring having a radial plenum formed therein and being positioned on said shaft such that said radial plenum is in communication with the radial hole in said shaft as said ring and shaft are rotated relatively to each other, said ring having a hole therein that extends radially from the outer periphery thereof to said radial plenum, and means for fixedly connecting an end of the other one of said transmission lines in the radial hole of said ring for communication with the radial plenum therein and thereby the radial hole in said shaft.

2. A coupling device as defined in claim 1 wherein said means comprises a first fitting that is threadedly received in the outer periphery of said ring in a region thereof that is in axial alignment with the radial hole therein.

3. A coupling device as defined in claim 1 further including a second fitting that is threadedly received in the end of said shaft in axial alignment with the first hole therein.

4. A coupling device as defined in claim 3 wherein said second fitting has a first end and a second end and includes a check valve therein, the first end of said fitting being received in the end of said shaft and the second end being adapted to be received in the end of an inflator, said check valve being operative to close off said first end of said fitting upon build up of pressure in the inflator.

5. A device as defined by claim 1 wherein,
said shaft is a vehicle steering shaft, and
said one of said tranmission lines extends from the first end of the first hole in said shaft to the second hole therein,
whereby said one of said transmission lines is entirely enclosed within the first hole of said shaft and is protected thereby from external influences that may tend to cause damage thereto.

6. Safety apparatus for protecting the driver of a vehicle during a collision, said vehicle having a steering wheel and an elongated steering shaft on which said steering wheel is mounted, a portion at least of the outer surface of shaft being cylindrical, said apparatus comprising an inflatable air bag that is expandable from a first condition to a second condition in which said air bag is adapted to restrain movement of the driver during a collision, comprising,
an inflator for inflating said inflatable air bag, said inflator being fixedly attached to said inflatable air bag and, mounted on said steering wheel for rotation therewith,
sensor means for detecting the occurrence of a collision, said sensor means being fixedly mounted on the vehicle and operative under predetermined conditions of deceleration of the vehicle to produce a shock wave,
first and second pyrotechnic transmission lines each of which has a first end and a second end for transmitting the sensor produced shock wave to said inflator for initiating operation thereof and thereby inflation of said air bag, the first end of said first transmission line being connected to said sensor and the first end of said second transmission line connected to said inflator,
means for coupling the second ends of said first and second transmission lines to allow said inflator to turn with the steering wheel comprising a ring positioned in surrounding relationship with the shaft of said vehicle, said ring having an outer periphery and an inner cylindrical surface, said inner cylindrical surface mating with the outer cylindrical surface of said shaft, being in sliding relationship therewith, said ring having a radial plenum formed therein and having a hole formed therein that extends radially from the outer periphery thereof to said radial plenum,
first means for fixedly connecting the second end of said first transmission line in the radial hole in said ring,
the end of said shaft adjacent the steering wheel having a first hole and a second hole formed therein, said first hole extending from said end of said shaft internally of and axially along a substantial portion of the length thereof, said second hole extending radially of said shaft to the outer surface of said shaft from the inner end of said first hole and providing communication with said radial plenum formed in said ring,
said second transmission line being positioned in said first hole in said shaft with the second end thereof positioned adjacent the second hole in said shaft and the first end thereof positioned adjacent said end of said shaft whereby said second transmission line is entirely enclosed within the first hole in said shaft and is protected from influences external of said shaft that may cause damage thereto, and
second means for fixedly connecting the first end of said second transmission line to said inflator to ignite it responsively to a shock wave produced by the said sensor responsively to the onset of a collision.

7. Safety apparatus as defined in claim 6 wherein said first means comprises a first fitting that is threadedly received in a tapped hole in the outer periphery of the ring in a region thereof that is in axial alignment with the radial hole therein, and
wherein said second means comprises a second fitting that is threadedly received in a tapped hole in the end of said shaft, said last mentioned tapped hole being coaxial with said first hole in said shaft.

8. Safety apparatus as defined in claim 7 wherein said second fitting has a first end and a second end with the first end being threadedly received in the end of said shaft and the second end threadedly received in said inflator.

9. Safety apparatus as defined by claim 8 further including a check valve in said second fitting for closing off the first end thereof upon build up of pressure within the inflator resulting from ignition thereof.

10. Safety apparatus as defined by claim 6 further including breakwire associated with the first end of said second transmisson line to provide an indication of whether said second transmission line has been fired.

11. Safety apparatus as defined by claim 6, wherein a breakwire is provided over the end of the shaft adjacent the steering wheel to provide a visual indication, during installation of the apparatus, as to whether the sensor and first and second pyrotechnic transfer lines have been fired, thus to guard against the attachment of the inflator to a pyrotechnic sensor and transfer line system that is no longer operative.

12. Safety apparatus as defined in claim 6 further including a second inflator and a junction box for initiating one or more pyrotechnic transmission lines, said junction box comprising a metal block having at least three tapped holes therein, the holes being all in substantially the same plane and all of the holes merging into an internal common opening in the block,
a plurality of pyrotechnic transmission lines each of which has a first end and a second end, one of said transmission lines being said first transmission line, and
a fitting individually associated with each of said holes and threadedly received therein for connecting a first end of an individually associated one of said transmission lines to said block, thh second end of said first transmission line being connected in the radial hole in said ring, the second end of a second one of said transmission lines being connected to said sensor, and the second end of a third one of said transmission lines being connected to ignite said second inflator.

13. Safety apparatus as defined in claim 12 further including a breakwire associated with the second end of said third transmission line to provide an indication of whether said third transmission line and associated pyrotechnic lines have been fired.

14. Safety apparatus as defined in claim 12 further including a fitting associated with the second end of each of said second and said third transmission lines for the connection of said second ends to said sensor and said second inflator, respectively.

15. Safety apparatus as defined by claim 14 wherein said second inflator is fixedly mounted to the dashboard of a vehicle.

16. Safety apparatus as defined by claim 14 wherein the fitting associated with the second inflator has a first end and a second end with the first end connected to the second end of said third transmission line and the second end connected to said second inflator, and includes a check valve therein for closing off the first end thereof upon build up of pressure within said second inflator resulting from ignition thereof.

17. Safety apparatus as defined in claim 14 further including a breakwire associated with the second end of the fitting associated with the second inflator for providing a visual indication during installation of the apparatus as to whether the sensor and pyrotechnic transfer lines have been fired, thus to guard against the attachment of the second inflator to a pyrotechnic sensor and transfer line system that is no longer operative.

18. An assembly for coupling an ignitive reaction to the inflator of a vehicle safety apparatus from a remotely located and relatively stationary sensor responsive to the onset of a collision, comprising:

first and second transmission lines each comprising a hollow tube having a reactive substance coating the inner surface thereof, which coating is operative to support and propagate a gaseous percussion wave throughout the length of the tube, an elongated shaft having an end and an outer cylindrical surface over a portion at least of the length thereof and having a first hole and a second hole formed therein, the first hole having a first end and a second end and extending from the first end internally of and axially from the end of said shaft along a substantial portion of the length thereof, the second hole extending radially of said shaft from the second end of the first hole to the outer surface of said shaft, said second one of said transmission lines being positioned in the first hole of said shaft and extending from said end thereof for the full length of the first hole, whereby said second one of said transmission lines is entirely enclosed within the first hole, a ring positioned in surrounding relationship with said shaft, said ring having an outer periphery and an inner cylindrical surface, said inner cylindrical surface mating with the outer cylindrical surface of said shaft, being in a rotative sliding relationship therewith, said ring having a radial plenum formed therein and being positioned on said shaft such that said radial plenum is in communication with the radial hole in said shaft as said ring and shaft are rotated relatively to each other, said ring having a hole therein that extends radially from the outer periphery thereof to said radial plenum, and means for fixedly connecting and end of said first one of said transmission lines in the radial hole of said ring for communication with the radial plenum therein and thereby the radial hole in said shaft.

19. An assembly as defined in claim 18 wherein said first end of said first hole of said shaft is positioned in cooperative relation with the inflator of said vehicle safety apparatus, and wherein the other end of said first one of said transmission lines is positioned in cooperative relation with the sensor thereof.

* * * * *